(12) United States Patent
Whitworth

(10) Patent No.: US 9,467,247 B2
(45) Date of Patent: Oct. 11, 2016

(54) SIGNAL DETECTION IN THE PRESENCE OF A JAMMING SIGNAL

(71) Applicant: ST-Ericsson SA, Plan-les-Ouates (CH)

(72) Inventor: Gerald Whitworth, Weedon (GB)

(73) Assignee: ST-ERICSSON SA, Plan-les-Ouates (CH)

( * ) Notice: Subject to any disclaimer, the term of this patent is extended or adjusted under 35 U.S.C. 154(b) by 41 days.

(21) Appl. No.: 14/405,475

(22) PCT Filed: Jun. 25, 2013

(86) PCT No.: PCT/EP2013/063257
§ 371 (c)(1),
(2) Date: Dec. 4, 2014

(87) PCT Pub. No.: WO2014/001323
PCT Pub. Date: Jan. 3, 2014

(65) Prior Publication Data
US 2015/0163012 A1   Jun. 11, 2015

Related U.S. Application Data

(60) Provisional application No. 61/667,456, filed on Jul. 3, 2012.

(30) Foreign Application Priority Data

Jun. 27, 2012   (EP) ..................................... 12173796

(51) Int. Cl.
*H04K 3/00* (2006.01)
*G01S 19/21* (2010.01)
*H04B 1/16* (2006.01)

(52) U.S. Cl.
CPC .................. *H04K 3/42* (2013.01); *G01S 19/21* (2013.01); *H04B 1/16* (2013.01); *H04K 3/228* (2013.01); *H04K 3/45* (2013.01); *H04K 3/822* (2013.01)

(58) Field of Classification Search
CPC ........ G01S 19/21; G01S 19/29; G01S 19/42; G01S 5/0027
USPC ............. 455/1, 3.01, 3.02, 3.03, 3.04, 67.11, 455/423–425, 422.1, 403, 67.13, 550.1, 455/426.1, 426.2, 427, 12.1, 428, 429; 375/150, 346
See application file for complete search history.

(56) References Cited

U.S. PATENT DOCUMENTS

| | | |
|---|---|---|
| 2002/0005802 A1 | 1/2002 | Bryant et al. |
| 2007/0211793 A1 | 9/2007 | Han |
| 2009/0128403 A1 | 5/2009 | Bryant et al. |

FOREIGN PATENT DOCUMENTS

| | | | | |
|---|---|---|---|---|
| CH | EP 1916535 A1 * | 4/2008 | ............. | G01S 19/21 |
| WO | 2008/017860 A1 | 2/2008 | | |

OTHER PUBLICATIONS

International Search Report issued in corresponding International application No. PCT/EP2013/063257, date of mailing Aug. 21, 2013.

Written Opinion of the International Searching Authority issued in corresponding International application No. PCT/EP2013/063257, date of mailing Aug. 21, 2013.

Extended European Search Report issued in corresponding European patent application No. EP 12 17 3796, date of completion of the search Nov. 6, 2012.

* cited by examiner

*Primary Examiner* — Keith Ferguson
(74) *Attorney, Agent, or Firm* — Patent Portfolio Builders PLLC

(57) ABSTRACT

A signal is detected and an unwanted jamming signal is removed from the detected signal. Respective first, second and third correlations between a received signal and signals at first, second and third frequencies are determined over a plurality of taps. The second frequency is higher than the first frequency and lower than the third frequency, and is equally spaced from the first and third frequencies. The second frequency is adapted to a frequency of the received signal such that peaks in the first and third correlations after corresponding adaptation of the first and third frequencies have substantially equal magnitudes. A difference is determined between non-peak magnitudes of the first and third correlations; and at least one of the correlations is compensated for the effects of the jamming signal, based on said difference.

15 Claims, 3 Drawing Sheets

US 9,467,247 B2

SIGNAL DETECTION IN THE PRESENCE OF A JAMMING SIGNAL

This invention relates to signal detection, and in particular to signal detection in the presence of a jamming signal.

In the case of a Global Navigation Satellite System (GNSS), such as the Global Positioning System (GPS), user equipment devices are used to detect radio signals transmitted by satellites in earth orbits.

Each satellite transmits signals at a frequency of 1575.42 MHz, referred to as the L1 frequency. GPS user equipment devices therefore include receivers for receiving these signals, and for extracting the information that allows the position of the device to be deduced. Such GPS receivers are known to be vulnerable to carrier wave (CW) signals within the GPS L1 frequency spectrum. These signals can "jam" the GPS receiver, and either reduce or prevent its ability to acquire and track the GPS satellite signals. Such "jamming" signals can be locally generated, possibly even from within the user's own platform, or radiated from other equipment in the local vicinity. In the vast majority of cases, these "jamming" signals are unintentional, often being a by-product of the particular equipment design. For example, the "jamming signal" might be a harmonic of the fundamental clock frequency generated in the device. Without sufficient filtering in place, the harmonic signals might be radiated and picked up by the GPS receiver.

It is possible to remove "jamming" signals using hardware or discrete filters. However, some existing mass market GPS user equipment devices have inadequate hardware filters for some applications. After manufacture, adding further hardware filters is not a cost effective option, but it is possible to improve the performance of such devices by downloading software upgrades.

According to a first aspect of the present invention, there is provided a method of detecting a signal and removing an unwanted signal from the detected signal, the method comprising:

determining respective first, second and third correlations over a plurality of taps between a received signal and signals at first, second and third frequencies, wherein the second frequency is higher than the first frequency and lower than the third frequency, and is equally spaced from the first and third frequencies;

adapting the second frequency to a frequency of the received signal such that peaks in the first and third correlations after corresponding adaptation of the first and third frequencies have substantially equal magnitudes;

characterized by:

determining a difference between non-peak magnitudes of the first and third correlations; and compensating at least one of the correlations for the effects of a jamming signal, based on said difference.

This has the advantage that the signal detection can be improved, because the second frequency can be more accurately adapted to the frequency of the received signal if the effect of the jamming signal is removed from the correlation values used in the adaption.

According to a second aspect of the invention, there is provided a receiver operating in accordance with the method of the first aspect.

DETAILED DESCRIPTION

Figure 1:
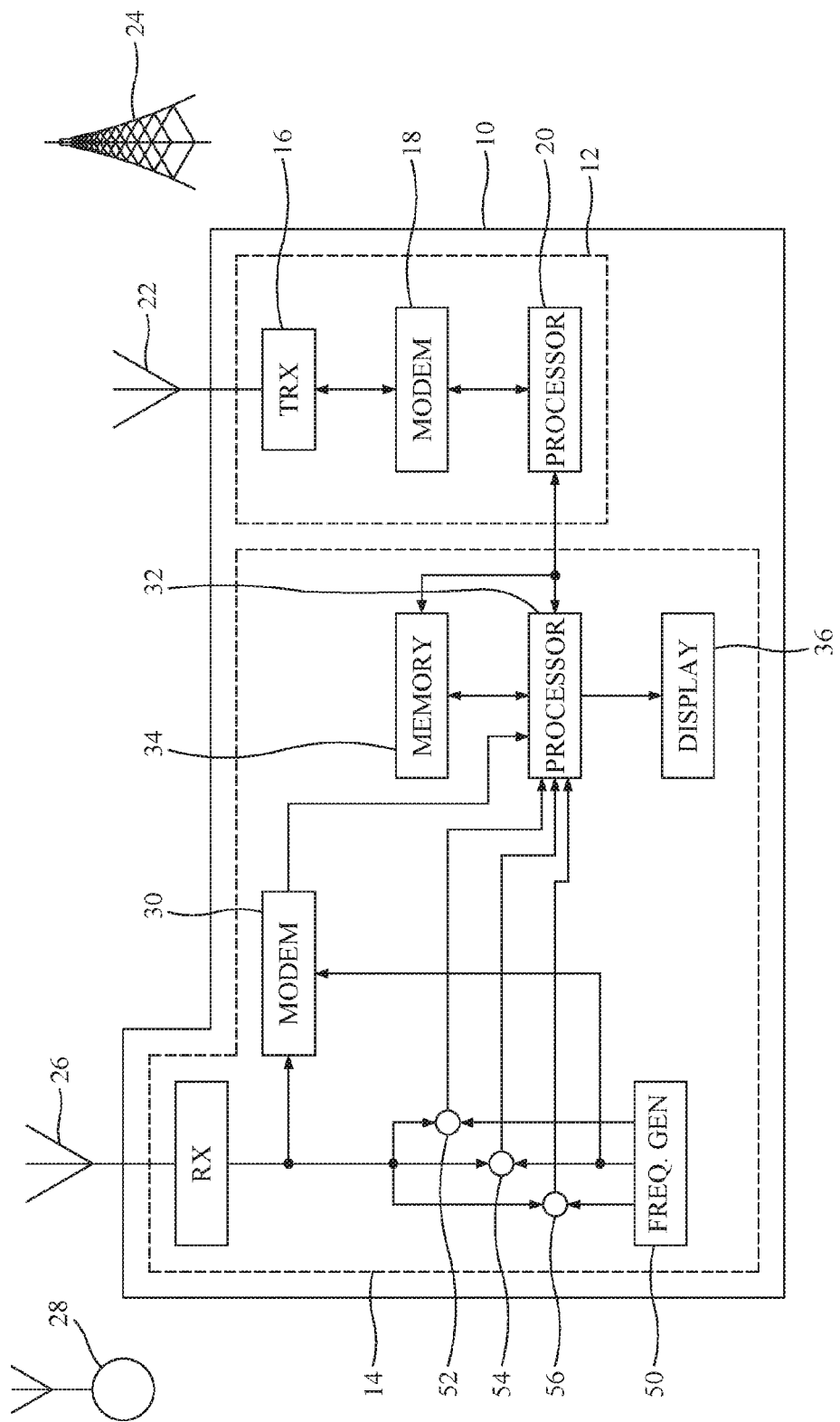
FIG. 1 is a block schematic diagram showing a GPS receiver in accordance with an aspect of the present invention.

FIG. 1 shows a GPS user equipment device 10 in the form of a communications device such as a mobile phone, personal computer, tracking device, or the like.

The user equipment device 10 in this embodiment comprises a cellular communication unit 12 and a Global Navigation Satellite System (GNSS) receiver unit 14, such as a Global Positioning System (GPS) receiver unit. Many features of these units are conventional, and will not be described further herein, except to the extent that that is necessary for an understanding of the present invention.

The cellular communication unit 12 comprises a transceiver 16, connected to a modem 18 and a processor 20, such that the cellular communication unit 12 can communicate through an antenna 22 with a base station 24 of a cellular communications network.

The GPS receiver unit 14 has receiver circuitry 24, connected to an antenna 26, for receiving signals from a satellite 28. The receiver circuitry 24 is also connected to a modem 30, which is connected in turn to a processor 32, which is configured to extract data from received GPS signals, in order to be able to determine the location of the unit. The processor 32 operates on the basis of algorithms stored in a memory 34. The location is then displayed on a display unit 36, for example in graphical form.

In order to be able to demodulate the received GPS signals, and extract the GPS data from them, in particular at low signal levels, it is advantageous to demodulate the signals using a signal at a frequency that is as close as possible to that of the received GPS signals. The frequency of the received signals is not exactly the same as the frequency of the transmitted signals, because of Doppler effects caused by the relative movement of the satellite 28 and the unit 14.

This illustrated embodiment of the invention therefore includes a tracking unit, comprising a frequency generator 50, which generates signals at three frequencies. The centre frequency is intended to be as close as possible to the frequency of the signals received by the GPS receiver unit 14, taking account of Doppler effects. Upper and lower frequency signals are also generated, at frequencies that are respectively higher and lower than the centre frequency by a fixed frequency margin, for example in the region of 20 Hz.

The lower frequency signal, the centre frequency signal and the upper frequency signal are passed to the respective first inputs of three correlators 52, 54, 56. The received GPS signal, detected by the receiver circuitry 24, is passed to the respective second inputs of each of the three correlators 52, 54, 56.

Output signals from the correlators 52, 54, 56 are then passed to the processor 32.

Detection of the location of the unit 14 is then determined by the processor 32 based on algorithms described in more detail below. The algorithms can be downloaded in the form of computer readable code via the cellular communications network using the cellular communication unit 12 and stored in the memory 34. Alternatively, the algorithms can be stored in the device in the form of computer readable code at the time of manufacture of the device.

Figure 2:
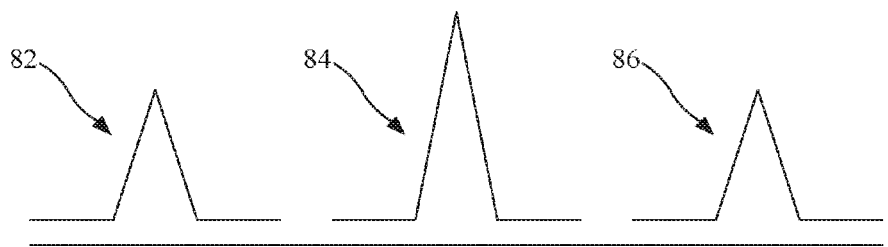
FIG. 2 illustrates a stage in the operation of the receiver of FIG. 1.

FIG. 2 is a schematic illustration of the operation of the frequency generator 50 and the correlators 52, 54, 56, as they act to track the GPS signal at low signal levels.

As mentioned above, three frequencies are generated locally, separated by typically 20 Hz. The centre one is set to be as close as possible to the anticipated Doppler frequency of the GPS satellite. The three correlators 52, 54, 56 then perform respective incoherent correlations between the received signal and all three of the locally generated frequencies. For each of the three frequencies, correlation is performed across 24 code taps, typically separated by a quarter chip of code phase. This gives a visibility of a range of 6 chips, corresponding to a physical distance in the order of 1800 meters. This allows the device to detect direct signals, but also reflected signals that will have a greater path length from the satellite than the direct line of sight signal.

The receiver software then attempts to maintain the peak code signal in the eighth tap of the 24 tap code array. FIG. 2 shows, schematically, the typical outputs of these correlators.

In FIG. 2, the output of the first correlator 52, corresponding to the lower frequency signal, is shown by the reference numeral 82, the output of the second correlator 54, corresponding to the centre frequency signal, is shown by the reference numeral 84, and the output of the third correlator 56, corresponding to the upper frequency signal, is shown by the reference numeral 86. As described above, each of these outputs has a peak, and the timings of the signals are adjusted so that the peak appears on the eighth tap.

The outputs of the first correlator 52 and the third correlator 56 are fed back to the frequency generator 50 as part of a frequency lock loop.

Thus, the output of the second correlator 54 has a higher peak than either of the outputs of the first correlator 52 and the third correlator 56, reflecting the fact that the centre frequency is the closest of the three frequencies to the Doppler frequency of the received signals.

The lower and upper frequencies are spaced equally from the centre frequency and so, when the peaks of the outputs of the first correlator 52 and the third correlator 56 are the same height (as shown in FIG. 2), this indicates that the upper and lower frequencies are equidistant from the Doppler frequency of the received signals, and hence that the centre frequency is very close to the frequency of the received signals.

In the event that there is any change in the frequency of the received signals, for example due to a change in velocity of the unit, then this frequency moves closer to either the upper frequency or the lower frequency. As a result, a difference arises in the heights of the peaks in the correlator outputs 82, 86. The frequency generator 50 detects this difference, and adjusts the centre frequency so that the heights of the peaks in the correlator outputs 82, 86 remain equal. This ensures that the centre frequency remains very close to the frequency of the received signals.

The output of the correlator 54 is then used on that basis to make pseudorange measurements in the processor 32 in a conventional manner.

However, this feedback loop is unable to operate correctly if a carrier wave (CW) jamming signal is present, and is within a few tens of Hz of any of the three locally generated frequencies. When a jamming signal is present in the band of one of the three frequencies, it has the effect of increasing the count of each tap of the affected frequency. All 24 code taps of the associated frequency are affected to a similar degree as a pure CW jamming signal has no pseudo-random code associated with its signal.

Figure 3:
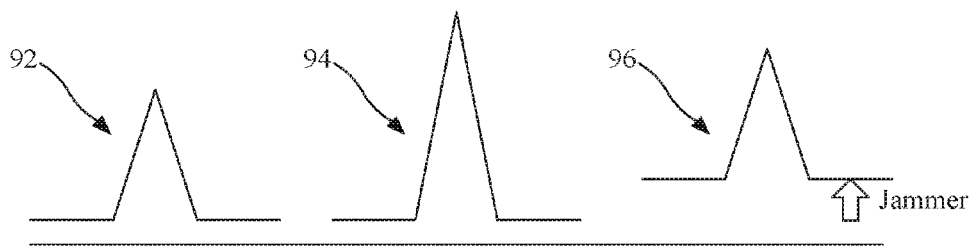
FIG. 3 illustrates a second stage in the operation of the receiver of FIG. 1.

Thus, the effect of the jamming signal is illustrated in FIG. 3. In FIG. 3, the output of the first correlator 52, corresponding to the lower frequency signal, is shown by the reference numeral 92, the output of the second correlator 54, corresponding to the centre frequency signal, is shown by the reference numeral 94, and the output of the third correlator 56, corresponding to the upper frequency signal, is shown by the reference numeral 96. As before, each of these outputs has a peak, and the timings of the signals are adjusted so that the peak appears on the eighth tap.

However, in this illustrated case, there is a jamming signal at a frequency close to the upper frequency, and this has had the effect of increasing the correlation count value for all code taps of the third correlator 56.

It can therefore be seen that the peak in the output 96 of the third correlator 56 is now higher than the peak in the output 92 in the output of the first correlator 52.

The effect of this is that, when the outputs of the first correlator 52 and the third correlator 56 are fed back to the frequency generator 50, the frequency generator adjusts the three frequencies in order to equalise the heights of the peaks in these two outputs.

Figure 4:
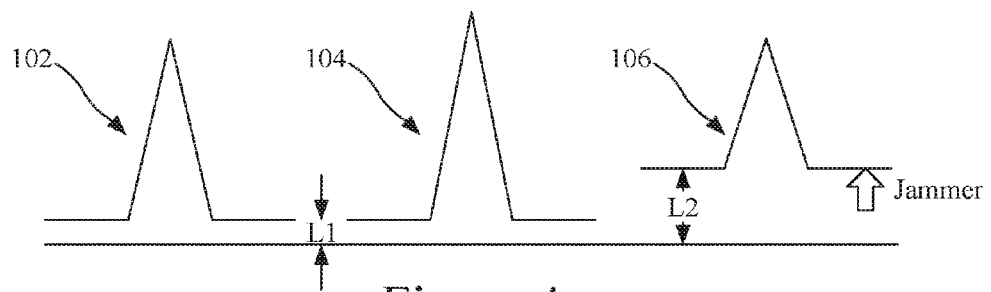
FIG. 4 illustrates a third stage in the operation of the receiver of FIG. 1.

This is illustrated in FIG. 4, in which the output of the first correlator 52, corresponding to the lower frequency signal, is shown by the reference numeral 102, the output of the second correlator 54, corresponding to the centre frequency signal, is shown by the reference numeral 104, and the output of the third correlator 56, corresponding to the upper frequency signal, is shown by the reference numeral 106.

Thus, it can be seen that the peaks of the outputs of the first correlator 52 and the third correlator 56 are the same height, but this has been achieved only by adjusting the centre frequency so that it is less close to the frequency of the received signals.

Thus, the method according to the present invention seeks to mitigate this problem by removing at least some of the effects of a jamming signal on the correlator outputs.

Figure 5:
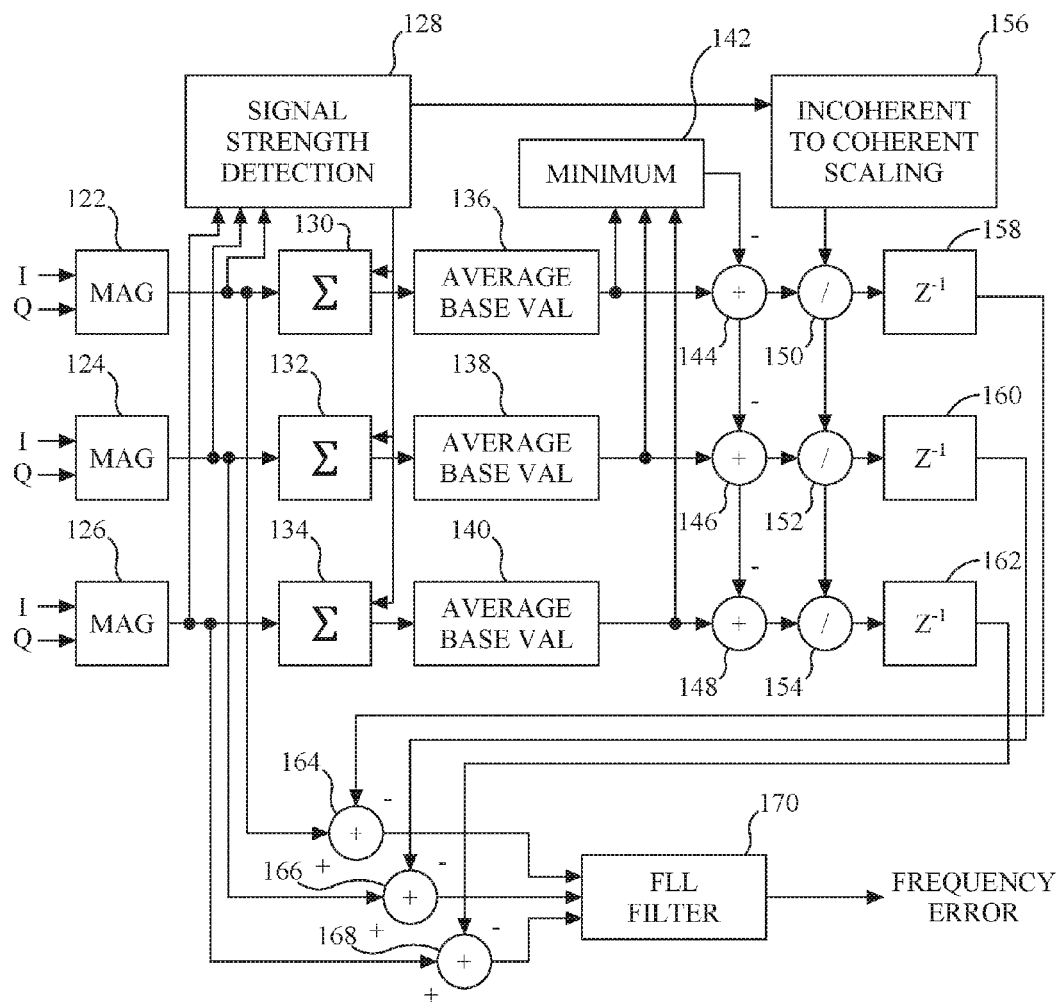
FIG. 5 is a block diagram, illustrating the data flow in a method in accordance with an aspect of the present invention.

FIG. 5 illustrates the relevant data flows 120.

Over a first detection period, namely one 20 ms data period of the satellite signals, the correlators 52, 54, 56 produce correlations in the complex I, Q domain (that is, with in-phase and quadrature components) on a coherent basis. These correlation values are passed to respective magnitude detection blocks 122, 124, 126.

However, when there are obstructions between the user and the satellites, for example when the GPS receiver is indoors, the GPS signals can be heavily attenuated. Under these conditions, coherent phase lock to the GPS satellite signal is not normally possible, and tracking can typically only be achieved by incoherently correlating over a second period of time, which may be up to several seconds. At these indoor GPS signal levels, the tracking is affected by jamming signals at much lower levels. For example, performance can start to degrade once the jamming signal power exceeds a level that is more than 10 dB less than the satellite signal.

A signal strength detection block 128 determines the strength of the received GPS signal. Based on this determination, the duration of the second, incoherent, period is determined. As mentioned above, the incoherent period can be up to several seconds when the received signal is very weak, or can in principle be equal to the first, coherent, detection period of 20 ms if the signal is strong enough The magnitudes determined by the magnitude detection blocks 122, 124, 126 are passed to respective adders 130, 132, 134, which sum their respective inputs over the duration of the incoherent period, as determined by the strength detection block 128.

The outputs of the adders 130, 132, 134 are passed to respective average base value calculators 136, 138, 140.

The outputs of the adders 130, 132, 134 are the magnitudes of the outputs of the correlators 52, 54, 56, summed over the incoherent period. As such, these outputs have the general form shown in FIG. 4. It is therefore necessary to estimate the power of the jamming signal contained in each of the three frequencies of code tap arrays.

This estimate relies on the assumption that the jamming signal affects all code taps of a specific frequency to a similar degree. Thus, as shown in FIG. 4, there is a jamming signal at a frequency close to the upper frequency, and this has had the effect of increasing the correlation count value for all code taps of the third correlator 56.

The base value calculators 136, 138, 140 determine the count values of the respective correlator outputs, at tap values where these are not influenced by the received satellite signal. Thus, a subset of the tap values is considered. In this illustrated example, where the peak is controlled so that it appears at the eighth tap, all taps before the eighth are ignored for this purpose, because they might include the effect of reflected signals. In addition, taps within one chip period of the peak are also ignored, because they will be influenced by the received satellite signal. In this case, the taps are separated by one quarter of a chip period, and so it is only taps after the twelfth that are considered when determining the respective base values.

FIG. 4 shows the forms of the correlator outputs in a schematic, idealised form, but it will be appreciated that in practice there will be variation in the count values at different taps.

Thus, the base value calculators 136, 138, 140 determine the count values of the respective correlator outputs, averaged across the tap values of the subset of the tap values that is being considered.

In this example, the outputs 102, 104 are not influenced by the jamming signal, and so they each have the base value L1. However, the output 106 is influenced by the jamming signal, and so it has the higher base value L2.

The three base values determined by the base value calculators 136, 138, 140 are passed to a minimum determining block 142, which determines the lowest of these three base values. Of course, in this illustrated example, the smallest base value, L1, applies to two of the outputs.

The three base values determined by the base value calculators 136, 138, 140 are also passed to the respective first inputs of subtractors 144, 146, 148, and the lowest value calculated by the minimum determining block 142 is passed to the respective second inputs of the subtractors 144, 146, 148. The result, in each case, is the increase in the base level, caused by the influence of the jamming signal. Thus, in this illustrated example, the result of the subtraction is zero in the case of the lower and centre frequencies, but is equal to (L2−L1) in the case of the upper frequency.

The outputs of the subtractors 144, 146, 148 thus represent the effect of the jamming signal over the whole incoherent period, and they are passed to respective dividers 150, 152, 154. The purpose of the dividers 150, 152, 154 is to determine the effect of the jamming signal in each 20 ms coherent detection period. Thus, the signal strength detection block 128, which determined the length of the incoherent period, supplies a signal to an incoherent to coherent scaling block 156, which determines the ratio of the lengths of the incoherent period and the coherent period. That is, when the incoherent period is equal to the coherent period, this ratio is equal to one, while, when the incoherent period is 2 s while the coherent period is 20 ms, this ratio is 100.

This ratio is passed to the dividers 150, 152, 154, and used to divide the outputs of the subtractors 144, 146, 148. Thus, the result of the division represents the effect of the jamming signal in each 20 ms coherent detection period. The outputs of the dividers 150, 152, 154 are passed to respective delay units 158, 160, 162, where they are stored during the whole of the next incoherent period, and passed as inputs to respective subtractors 164, 166, 168 throughout that incoherent period.

The other inputs of the subtractors 164, 166, 168 receive inputs from the magnitude detection blocks 122, 124, 126. As noted above, the magnitude detection blocks produce an output value during each 20 ms coherent detection period. Thus, the output of each divider 150, 152, 154 is subtracted from the corresponding magnitude value produced by the respective magnitude detection block 122, 124, 126 during each coherent detection period during the appropriate incoherent period.

The jamming signal and the satellite signal are correlated in the complex I, Q domain, whereas the incoherent measurements are made in the magnitude domain. Hence the jamming signal can in fact both add to, and subtract from, the satellite signal, in the coherent period. To compensate for this, it is possible to subtract only a portion of the detected jamming signal from the incoherent period during each subsequent coherent period.

Thus, this removes at least some of the effects of the jamming signal. The results are passed to the FLL filter 170. The block represented as the FLL filter 170 is a software algorithm that enables the frequency generated by the frequency generator 50 to be kept aligned with the Doppler frequency of the signal received from the satellite 28, as described above with reference to FIG. 2. In general terms, the frequency generator 50 is able to adapt the centre frequency based on a frequency error that is indicated by the relative heights of the peaks in the correlations at the upper and lower frequencies, using correlations which have been adjusted as described here to remove the effects of the jamming signal.

Thus, the method described in this example determines the effect of the jamming signals over the whole of an incoherent period, and then applies the results during every coherent period of the following incoherent period. This latency means that the method is unable to deal with the effects of rapidly varying jamming signals, for example when the unit is accelerating rapidly. However, the low level of jamming signals relative to the random noise in the signal means that jamming signals will typically not be detectable within a 20 ms interval, and so it is not always possible to determine (and hence remove) the effect of the jamming signal in each individual coherent period.

In addition to mitigating the effects of the jamming signal, and thus improving the accuracy of the centre frequency, the magnitude of the jamming signal can also calculated, allowing determination of the Jammer to Noise ratio (JNR), which can then be output for information. The JNR figure is calculated from the non peak correlations of all three frequencies, for example Jammer to Noise power (in dB Hz) is calculated as 6 times log (base 2) (Jammer Power/Noise Power), where the Jammer Power and Noise Power are read from the magnitude detectors 122, 124, 126, and normalized to a one second period. As all three frequencies are used, a large JNR figure could be published when the jammer is coincident with the centre frequency. For example, the calculated JNR figure can be used when estimating the degradation of the signal in the Position Engine in which the GPS signals are used.

When there are no obstructions between the users GPS antenna and the satellite, the received signal power will be strong, and the receiver will be able to maintain a coherent phase lock on the satellite signals. With strong GPS signals, jamming occurs only infrequently, and generally, the receivers will not be affected by jamming signals until the magnitude of the jamming signal approaches that of the GPS satellite signal. The use of software algorithms is thus of maximum benefit when the GPS signals are low level, i.e. less than 25 dB Hz, and jamming signals are present between this level and 10 dB below this level.

There is therefore disclosed a method that mitigates the effect of jamming signals, and hence enables lock to be maintained on the satellite, and hence measurements to be available, in circumstances where the signal lock might otherwise have been lost due to the influence of the jamming signals.

The invention claimed is:

1. A method of detecting a signal and removing an unwanted signal from the detected signal, the method comprising:
   determining respective first, second and third correlations over a plurality of taps between a received signal and signals at first, second and third frequencies, wherein the second frequency is higher than the first frequency and lower than the third frequency, and is equally spaced from the first and third frequencies;
   adapting the second frequency to a frequency of the received signal such that peaks in the first and third correlations after corresponding adaptation of the first and third frequencies have substantially equal magnitudes;
   characterized by:
   determining a difference between non-peak magnitudes of the first and third correlations; and
   compensating at least one of the correlations for the effects of a jamming signal, based on said difference.

2. A method as claimed in claim 1, wherein the step of determining the difference between non-peak magnitudes of the first and third correlations comprises determining a difference between magnitudes of the first and third correlations at tap positions corresponding to signals arriving before the respective peaks.

3. A method as claimed in claim 2, wherein the step of determining the difference between non-peak magnitudes of the first and third correlations comprises determining a difference between average magnitudes of the first and third correlations over a range of tap positions corresponding to signals arriving before the respective peaks.

4. A method as claimed in claim 1, wherein the steps of determining the difference between non-peak magnitudes of the first and third correlations; and compensating at least one of the correlations for the effects of a jamming signal, based on said difference, comprise:
   determining non-peak magnitudes of the first, second third correlations;
   determining a lowest of the non-peak magnitudes of the first, second third correlations;
   selecting said lowest of the non-peak magnitudes of the first, second third correlations from each of the non-peak magnitudes of the first, second third correlations to form respective differences; and
   subtracting the respective differences from the magnitudes of the first, second third correlations.

5. A method as claimed in claim 1, further comprising:
   determining said first, second and third correlations during each of a plurality of first periods;
   determining a duration for a second period, based on a signal strength of the received signal, said second period extending over at least one first period;
   determining said difference between the non-peak magnitudes of the first and third correlations over a second period; and
   compensating at least one of the correlations for the effects of a jamming signal, based on said difference, during the or each first period of a following second period.

6. A method as claim in claim 1, comprising using the adapted second frequency for demodulating the signal for detection from the received signal.

7. A method as claimed in any claim 1, wherein the received signal is a signal from a satellite navigation system.

8. A computer program product, comprising a non-transitory computer readable medium, containing instructions for performing a method as claimed in claim 1.

9. A receiver, for detecting a signal and removing an unwanted signal from the detected signal, the receiver comprising:
   at least one correlator for determining respective first, second and third correlations over a plurality of taps between a received signal and signals at first, second and third frequencies, wherein the second frequency is higher than the first frequency and lower than the third frequency, and is equally spaced from the first and third frequencies;
   a controller for adapting the second frequency to a frequency of the received signal such that peaks in the first and third correlations after corresponding adaptation of the first and third frequencies have substantially equal magnitudes;
   wherein the controller is configured to:
   determine a difference between non-peak magnitudes of the first and third correlations; and
   compensate at least one of the correlations for the effects of a jamming signal, based on said difference.

10. A receiver as claimed in claim 9, wherein the controller is configured to determine the difference between non-peak magnitudes of the first and third correlations by determining a difference between magnitudes of the first and third correlations at tap positions corresponding to signals arriving before the respective peaks.

11. A receiver as claimed in claim 10, wherein the controller is configured to determine the difference between non-peak magnitudes of the first and third correlations by determining a difference between average magnitudes of the first and third correlations over a range of tap positions corresponding to signals arriving before the respective peaks.

12. A receiver as claimed in claim 9, wherein the controller is configured to determine the difference between non-peak magnitudes of the first and third correlations; and compensate at least one of the correlations for the effects of a jamming signal, based on said difference, by:
   determining non-peak magnitudes of the first, second third correlations;
   determining a lowest of the non-peak magnitudes of the first, second third correlations;

selecting said lowest of the non-peak magnitudes of the first, second third correlations from each of the non-peak magnitudes of the first, second third correlations to form respective differences; and subtracting the respective differences from the magnitudes of the first, second third correlations.

13. A receiver as claimed in claim 9, wherein the controller is further configured to:

determine said first, second and third correlations during each of a plurality of first periods;

determine a duration for a second period, based on a signal strength of the received signal, said second period extending over at least one first period;

determine said difference between the non-peak magnitudes of the first and third correlations over a second period; and compensate at least one of the correlations for the effects of a jamming signal, based on said difference, during the or each first period of a following second period.

14. A receiver as claimed in claim 9, comprising a demodulator configured to demodulate the signal for detection from the received signal using the adapted second frequency.

15. A satellite navigation system receiver as claimed in claim 9.

* * * * *